United States Patent [19]
Ho et al.

[11] Patent Number: 5,629,918
[45] Date of Patent: May 13, 1997

[54] ELECTROMAGNETICALLY ACTUATED MICROMACHINED FLAP

[75] Inventors: Chih-Ming Ho, Rancho Palos Verdes; Denny K. Miu, Valencia, both of Calif.; Jeremy Tzong-Shyng Leu, Plainsboro, N.J.; Raanan Miller, Pasadena, Calif.; Amish Desai, Pasadena, Calif.; Chang Liu, Pasadena, Calif.; Tom Tsao, Pasadena, Calif.; Yu-Chong Tai, Pasadena, Calif.

[73] Assignees: The Regents of the University of California, Oakland; California Institute of Technology, Pasadena, both of Calif.

[21] Appl. No.: 377,018

[22] Filed: Jan. 20, 1995

[51] Int. Cl.$^6$ .................................................. B44C 1/22
[52] U.S. Cl. .................... 369/112; 216/22; 310/40 MM
[58] Field of Search .................................. 369/126, 124, 369/112; 910/309, 40 MM, 254; 216/13, 17, 2, 22; 60/520, 698; 29/598; 250/289

[56] References Cited

U.S. PATENT DOCUMENTS

| | | | |
|---|---|---|---|
| 4,740,410 | 4/1988 | Muller et al. | 428/133 |
| 4,922,159 | 5/1990 | Phillips et al. | 318/128 |
| 5,206,983 | 5/1993 | Guckel et al. | 29/598 |
| 5,322,258 | 6/1994 | Bosca et al. | 251/65 |
| 5,412,265 | 5/1995 | Sickafus | 310/254 |
| 5,428,961 | 7/1995 | Sakakibara et al. | 60/698 |
| 5,454,904 | 10/1995 | Ghezzo et al. | 216/13 |
| 5,457,956 | 10/1995 | Bowman et al. | 60/520 |
| 5,466,932 | 11/1995 | Young et al. | 250/289 |

OTHER PUBLICATIONS

W. Gu et al., AIAA Journal, vol. 31, pp. 1177–1186, (Jul. 1993).

K. Rinoie, Aeronautical Journal, vol. 97 (961), pp. 33–38 (Jan. 1993).

I.J. Busch–Vishniac, "The Case for Magnetically driven Microactuators," Sensors and Actuators, A33 at 207–20 (1992).

C.H. Ahn et al., IEEE J. Microelectromechanical Systems, vol. 2 (1) at 15–22 (Mar. 1993).

H. Guckel et al., 1993 IEEE Workshop on Microelectromechanical Systems at 7–11 (1993).

B. Wagner et al., Sensors and Actuators A(32) at 598–03 (1992), "Microactuators with moving magnets for linear, torional or multiaxial motion".

S.W. Yuan, Foundations of Fluid Mechanics, Prentice Hall (1972).

*Primary Examiner*—Georgia Y. Epps
*Assistant Examiner*—Kim-Kwok Chu
*Attorney, Agent, or Firm*—Daniel L. Dawes

[57] ABSTRACT

A surface micromachined micromagnetic actuator is provided with a flap capable of achieving large deflections above 100 microns using magnetic force as the actuating force. The flap is coupled by one or more beams to a substrate and is cantilevered over the substrate. A Permalloy layer or a magnetic coil is disposed on the flap such that when the flap is placed in a magnetic field, it can be caused to selectively interact and rotate out of the plane of the magnetic actuator. The cantilevered flap is released from the underlying substrate by etching out an underlying sacrificial layer disposed between the flap and the substrate. The etched out and now cantilevered flap is magnetically actuated to maintain it out of contact with the substrate while the just etched device is dried in order to obtain high release yields.

33 Claims, 8 Drawing Sheets

ELECTROMAGNETICALLY ACTUATED MICROMACHINED FLAP

The U.S. Government has certain rights in this invention pursuant to Grant No. F 49620-1-93-0332 and F 49620-94-1-0008 awarded by the U.S. Air Force.

BACKGROUND OF THE INVENTION

1. Field of the Invention

The invention relates to the filed of micromachining electromagnetic devices, and in particular, a micromachined magnetic actuator and a method for releasing the magnetic actuator from its parent wafer.

2. Description of the Prior Art

It is generally known that magnetic actuation provides stronger forces over a longer distance as compared to electrostatic driving mechanisms. See W. Gu et al., AIAA Journal. Vol. 31, No. 7, pp 1177–86 (1993); and K. Rinoie, Aeronautical Journal, Vol. 97 (961), pp 33–38 (1993). Electromagnetic driving may be used as the motive force in many different configurations, such as shown by I. J. Busch-Vishniac, Sensors and Actuators, A33 at 207–20 (1992); and C. H. Ahn et al., IEEE J. Microelectromechanical Systems, Vol. 2 (1) at 15–22 (1993), even in combination with the electrostatic forces, H. Guckel et al., 1993 IEEE Workshop on Microelectromechanical Systems at 7–11 (1993). The introduction of electrochemical deposition of Permalloy (e.g. 50/50 FeNi) has dramatically increased the power of electromagnetic driving mechanisms and efficiency of magnetic actuators as described in B. Wagner et al., Sensors and Actuators, A(32) at 598–03 (1982); C. Liu et al., 1994 IEEE Workshop on Microelectromechanical Systems at 57–62 (1994); and S. W. Yuan, Foundations of Fluid Mechanics, Prentice Hall (1972).

What is needed is a design for a micromachined micromagnetic actuator which can be made by surface micromachining and which are adapted to be reproduced in large scale arrays.

As will be described below, the illustrated embodiment of the invention is discussed generally, then specifically, in any array applied to a delta wing. The delta wing is one of the fundamental configurations for generating lift forces and its aerodynamic control is a design feature of great importance. When airflow hits the two leading edges of the wing at a certain angle of attack, two counter-rotating leading edge vortices are separated from the laminar flow and propagate over the wing's top surface. The two high momentum, low pressure vortices contribute identical vortex lifting forces on the two sides of the wing, the sum of these being about 40 percent of the total lifting forces. The strength and position of these two vortices are determined by the boundary layer conditions near their separation points. The boundary layer is roughly 1 to 2 millimeters thick at wind tunnel flow speeds of less than 20 meters per second. The thickness will decrease when the flow speed is increased.

What is needed then is some means of controlling these vortices in order to provide a control function for delta wing.

BRIEF SUMMARY OF THE INVENTION

The invention is a microelectromechanical magnetic actuator comprising a substrate having a surface and a micromachined flap defined from the surface of the substrate and separated therefrom. At least one micromachined beam defined from the surface of substrate couples the flap to the substrate. A magnetic layer is disposed on the flap. A selectively actuatable magnetic field source is disposed proximate to the actuator to create a magnetic field in the vicinity of the flap to bend the flap on the beam outwardly from the plane of the surface of the substrate. As a result, an out of plane magnetically actuated flap is provided.

In one embodiment the magnetic source is an electromagnet. The magnetic layer is comprised of a magnetic coil disposed on the flap.

The actuator further comprises a current source. The magnetic coil is coupled to the source of current by conductive lines extending from the magnetic coil to the current source. The lines are disposed along the beam. Preferably at least two beams are provided to couple the flap to the substrate.

In another embodiment the magnetic layer is comprised of a permanent magnet and the magnetic source is a permanent magnet. More specifically, the permanent magnet is a layer of Permalloy.

The flap has a plurality of holes defined therein to facilitate separation of the flap from the underlying substrate.

The invention is also characterized as a method of fabricating a microelectromagnetic magnetic actuator comprising providing a substantially completed microelectromechanical magnetic actuator on a sacrificial layer disposed on an underlying substrate. The sacrificial layer upon which the microelectromechanical magnetic actuator has been fabricated is removed by etching away the sacrificial layer through at least one opening defined through the microelectromechanical magnetic actuator to expose the underlying sacrificial layer. The etched device is dried while simultaneously actuating the microelectromechanical magnetic actuator to maintain the released portions of the actuator out of contact with the underlying substrate until the drying is complete.

The invention can alternatively be characterized as an improvement in a method of fabricating a surface micromachine cantilevered layer disposed over an underlying substrate. The improvement comprises providing the cantilevered layer on a sacrificial layer which in turn is disposed upon the substrate. A magnetic layer is disposed on the cantilevered layer. The sacrificial layer beneath at least part of the cantilevered layer is removed to release the cantilevered layer from the substrate. The cantilevered layer is simultaneously maintained apart from the substrate layer by exposing the magnetic layer to a magnetic field, which tends to lift the cantilevered layer away from the substrate. The cantilevered is maintained separate from the substrate until removal of the sacrificial layer is completed and possibility of adhesion of the cantilevered layer to the substrate substantially extinguished.

Removing the sacrificial layer from underneath at least part of the cantilevered layer comprises wet etching the sacrificial layer away and where simultaneously maintaining the cantilevered layer out of contact with the substrate is performed until the microelectromagnetic device is dried.

In another embodiment the improvement further comprising disposing an organic polymer on at least the cantilevered layer prior to disposition of the magnetic layer thereon and selectively removing the organic polymer layer and the magnetic layer disposed thereon after removal of the sacrificial layer is complete.

The improvement further comprises disposing an organic polymer on at least the cantilevered layer prior to disposition of the magnetic layer thereon and selectively removing the organic polymer layer and the magnetic layer disposed thereon after removal of the sacrificial layer is complete.

The invention is again characterized as an improvement in a method of controlling turbulent flow across the surface of an object. The improvement comprises disposing a plurality of microelectromechanical actuators each having selectively operable flap disposable out of the plane of the microactuator into a boundary layer above the surface over which the turbulent flow is established. At least some of the plurality of microelectromechanical actuators are selectively actuated to dispose their corresponding flaps into the boundary layer to thereby effect turbulent flow.

While the illustrated embodiment describes movement of flaps 14 in a direction out of the plane of the wafer or substrate, it must be expressly understood that deflection in all directions is included within the scope of the invention. The beam structure could be modified consistent with the teachings of the invention to include lateral deflection of a single or multiple beams in the plane of the wafer or substrate or any combination thereof.

Selectively disposing the corresponding flaps into the boundary layer comprises electromagnetically actuating the flaps to bend the flaps into the boundary layer out to the plane of the actuator.

In one embodiment the surface is an airplane control surface and selectively disposing the corresponding flaps serves to provide a control force to the airplane control surface.

Alternatively, selectively disposing the corresponding flaps into the boundary layer serves to reduce fluid drag of the surface for any purpose.

The invention may be better visualized by now turning to the following drawings wherein like elements are referenced by like numerals.

The invention as set forth in its illustrated embodiments and other embodiments disclosed in the specification can now be better understood by turning to the following detailed description.

DETAILED DESCRIPTION OF THE PREFERRED EMBODIMENTS

A surface micromachined micromagnetic actuator is provided with a flap capable of achieving large deflections above 100 microns using magnetic force as the actuating force. The flap is coupled by one or more beams to a substrate and is cantilevered over the substrate. A Permalloy layer or a magnetic coil is disposed on the flap such that when the flap is placed in a magnetic field, it can be caused to selectively interact and rotate out of the plane of the magnetic actuator. The cantilevered flap is released from the underlying substrate by etching out an underlying sacrificial layer disposed between the flap and the substrate. The etched out and now cantilevered flap is magnetically actuated to maintain it out of contact with the substrate while the just etched device is dried in order to obtain high release yields.

Figure 1:
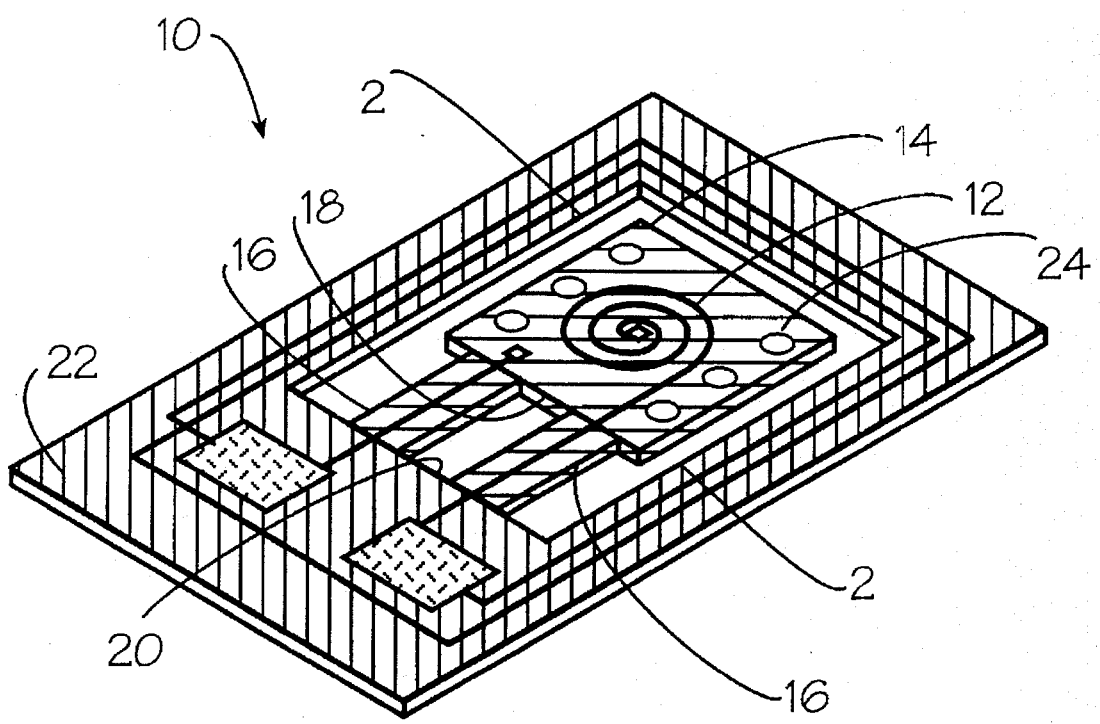
FIG. 1 is a perspective view of a first embodiment of an out-of-plane magnetic actuator devised according to the invention.
Figure 2:
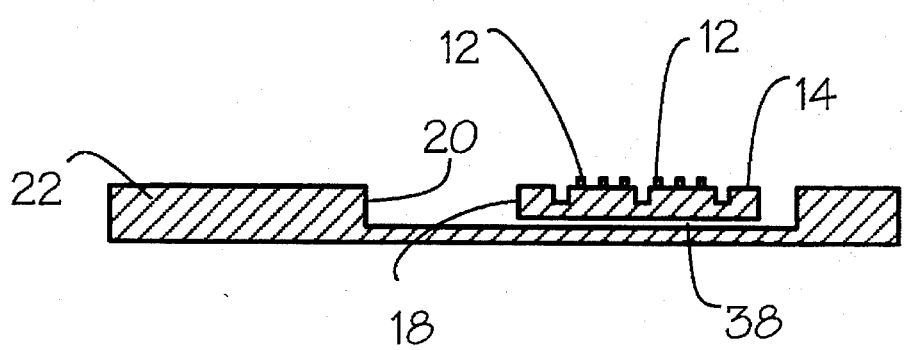
FIG. 2 is a cross-sectional view of the embodiment of FIG. 1 taken through section lines 2—2.

FIG. 1 is a perspective view of a micromachined magnetic actuator 10, and FIG. 2 is a cross section view taken through section lines of 2—2 of FIG. 1. Magnetic actuator 10 is comprised of a spiral magnetic coil 12 disposed on the top of a flap 14 hinged by two cantilever beams 16 extending from side 18 of flap 14 to an opposing side 20 of a surrounding substrate 22.

Actuator 10 of FIG. 1 is a surface-micromachined magnetic actuator and, as will be described below, is used as an integral part of a microelectromechanical system to control turbulence for drag reduction. In this application in order to be effective, flaps 14 are required to achieve a vertical deflection of at least +/−100 microns at the end-point of their travel with a bandwidth of over 10 kHz. Forces of the order of 1–10 micro-Newtons are needed for flaps 14 to effectively operate.

The size of flap 14 may vary, typically from 250 microns to 900 microns on a side with beam 16 having a length varying from 100 to 360 microns and a width from 14 to 50 microns. Etch holes 24, which typically have a size of 15×15 micron$^2$ are strategically disposed through flap 14 to allow faster etching of a polysilicon glass sacrificial layer 26 as shown in FIG. 2 to ensure that all structures in a wafer are released in roughly the same amount of time as will become more apparent when the method of fabrication discussed in connection with FIGS. 3a–f is considered.

In addition to the suspension of laminated thin film flap 14 by a pair of linear parallel beams 16, it is within the scope of the invention that flap 14 could also be supported by a plurality of serpentine beams defined at each of its corners.

It is to be understood that according to the invention either the polarity of the magnetic field to which the actuator is exposed or the polarity of the coils on flap 14 itself may be switched or inverted. Thus in an array of actuators the polarity and phase of current flowing in the coils can be changed or varied to obtain a distributed motion in the array of the flaps.

Furthermore, the effective internal magnetization of Permalloy is about 2.2 Oe so that it is a soft magnet. Its magnetic polarity can thus be readily changed by an impressed field. If the polarization of magnetization of the permalloy layer is such that the flap rotates down into the silicn substrate and is stopped by it instead of being rotated out of the plane, then an unstable high energy configuration is assumed by the system. The polarity of the Permalloy layer spontaneously changes or inverts so that the flap will now rotate out of the plane of the substrate. The inclusion of mechanical stops to limit the downward motion of the flap insures that this spontaneous magnetization reversal occurs.

There are four factors to consider in design of a magnetic actuator as described: the factors are magnetic, mechanical, thermal, electrical and fluid dynamic. The magnetic force that the flap experiences in a nonuniform magnetic field is given by the following equation (1) where B is the magnetic flux density vector, N the number of turns of the coil, I the current that passes through the coil, $R_{av}$ the average radius of the coil, and N the normal vector to the current loop.

$$\vec{F} = NI\pi(R_{au})^2(\vec{h}\cdot\nabla)\vec{B} \quad (1)$$

Mechanically, the choice of spring constant of flap 14 must be a compromise. In order to achieve a large displacement, flap 14 should have a small spring constant. However, having a large bandwidth requires a large spring constant. The force constant of flap 14 is obtained by using an approximate composite layer model as described by W. C. Young, Roark's Formulas for Stress and Strain, 6th Edition, McGraw Hill (1989), or by using finite element simulation. In the presently preferred embodiment, all flaps 14 are designed to have force constants in the range of 0.001–0.010 Newtons per meter.

The intrinsic stresses of the different layers contribute to a bending moment acting on flap 14, which results in flap 14 having a curved rather than a flat configuration at rest. The magnitude of curvature of a thin bi-material plate is calculated by the following equation (2)

$$\frac{FH}{2} = \frac{E_1 I_1 + E_2 I_2}{\rho}$$

where F is the lateral force due to the intrinsic stress, H is the total height of the bi-material layer, $E_1$ and $I_1$ are Young's modulus and moment of inertia for the top layer with $E_2$ and $I_2$ being Young's modulus and moment of inertia for the bottom layer, with $\rho$ being the curvature of the plate.

Thermally, as the temperature of flap 14 rises, the thermal mismatch of different materials in the composite layers will cause the flap to bend down, which is generally undesirable in the case of use on an aerodynamic surface. Given the geometry, and material composition, this bending can be calculated as described S. Timoshenko, "Analysis of Bi-Metal Thermostats," Journal O.S.A. and R.S.I 11 at 233–55 (September 1925). Geometry and material composition are thus chosen to minimize thermal bending.

Low electrical resistance is desirable to minimize heat generation and, thus, thermal bending of flap 14. The total resistance is comprised of the metal coil resistance, the contact resistance between the metal and doped polysilicon, and the resistance of the polysilicon flap 14. The resistance of polysilicon flap 14 contributes 60 to 70 percent of the total resistance which ranges from 30 to 70 ohms and hence the majority of the heating.

Figure 3A:
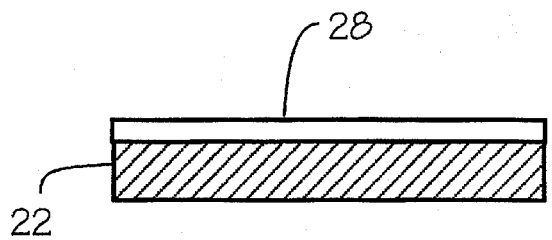
FIGS. 3a–f are simplified cross-sectional views in enlarged scale showing the method of fabrication of the actuator of FIGS. 1 and 2.
Figure 3B:
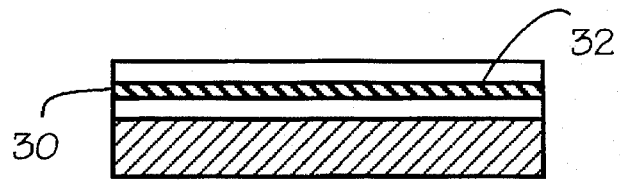
Figure 3C:
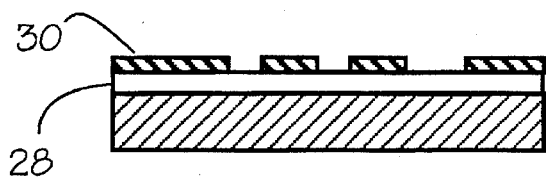

The structure and design parameters of magnetic actuator 10 now having been generally described, consider the method of its manufacture as set forth in FIGS. 3a–3f. A 2.5 micron thick phosphosilicate glass layer 28 is provided as a sacrificial layer with a measured 6 percent phosphorous content. Layer 28 is first deposited on the wafer surface using low pressure chemical vapor deposition and is followed by a 6,000 angstrom thick low pressure chemical vapor deposition of polysilicon layer 30 as shown in FIG. 3b disposed at 620 degrees Centigrade. In order to dope polysilicon layer 30, the wafer is coated with a 5,000 angstrom layer 32 of phosphosilicate glass as shown in FIG. 3b and then annealed at 950 degrees C. for 1 hour to release its intrinsic stress. During the annealing, polysilicon layer 30 is doped by phosphorous diffusion and the resulting sheet resistivity is of the order of 50.5 ohms per square centimeter. Top glass layer 32 is subsequently removed and polysilicon layer 30 is patterned by photolithography as shown at FIG. 3c.

Figure 3D:
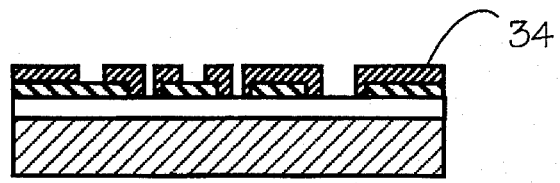

Thereafter, a 3,000 angstrom low pressure chemical vapor deposition, low stress, silicon nitride layer 34 is deposited at 820 degrees C. to cover and insulate polysilicon flap 14. The nitride is then patterned to define the contact holes as shown in FIG. 3d.

Figure 3E:
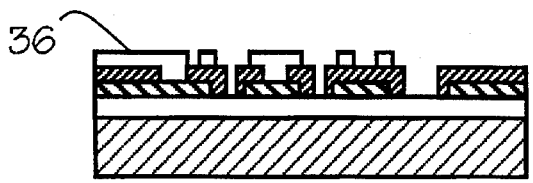
Figure 3F:
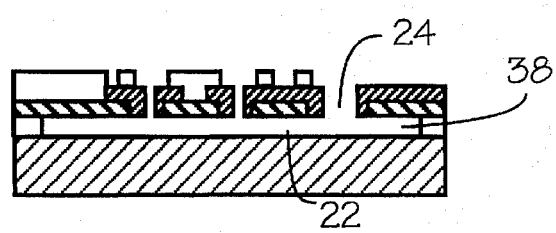

A 4,000 angstrom aluminum layer 36 is then disposed by vapor deposition and patterned to define coils 12 as shown in FIG. 3e. Buffered hydrofluoric acid and oxide pad etchant, Type 777, from Olin Hunt Specialty Products Inc., are then employed to etch away the underlying sacrificial layer 28 to obtain flap release as depicted in FIG. 3f.

To completely underetch at 200×200 square micro flap 14, pad etchant required approximately 3 hours, and buffered hydrofluoric acid approximately 30 minutes. The slow etch rate, together with the low etching selectivity over aluminum metalization, may compromise yield. Yields may be improved by using a chromium/gold metalization in place of aluminum layer 36. An adhesion layer of 100 angstrom chromium beneath a 4,000 angstrom gold layer can be used in combination with a 49 percent hydrofluoric acid etchant to completely undercut the plate structure without damaging metalization and to increase yield. The etching process in this case takes about 2 minutes to complete the amount of etching on flap 14 of the polysilicon nitride layers is minimal.

A subsequent drying process is also essential for obtaining a high yield. Different drying techniques are known, such as described by G. T. Mulhern et al., "Supercritical Carbon Dioxide Drying of Microstructures," Technical Digest of Transducers '93 at 296–98 (1993); C. Mastrangelo et al., "A Dry Release Method Based on Polymer Columns for Microstructure Fabrication," IEEE Microelectromechanical Systems Workshop, Fort Lauderdale, Fla. at 77–81 (1992); R. L. Alley et al., "The Effect of Release-Etch, Processing of Surface Microstructure Stiction," IEEE Solid State Sensor and Actuator Workshop, Hiltonhead Island, S.C., at 202–07 (1992); and T. Hirano et al., "Dry Releasing of Electroplated Rotational and Overhanging Structures," IEEE Microelectromechanical Systems Workshop, Fort Lauderdale, Fla., at 278–83 (1992).

In the preferred embodiment, the process includes rinsing the etched wafer in deionized water for 20 minutes and in acetone followed by an alcohol rinse of 1 minute each. The alcohol is removed by 10 minutes of deionized water rinse and the wafer is baked dry by an infrared lamp. The flap stiction to the substrate is almost negligible and a yield near 100 percent is obtained. Drying with the use of an infrared lamp can be used in conjunction with a convection oven at 120 degrees C.

In order to prevent flap 14 from sagging down to the substrate 22 and thus forming a permanent bond during fabrication, silicon nitride tethers may be used to hold flap 14 in place during the sacrificial etching process of FIG. 3f. In the preferred process, the tethers are typically 100 microns long, 6 microns wide and 30 angstroms thick, being of the same dimensions as low stress nitride layer 34. The tethers are broken manually by manipulator probes once the plates are freed.

Since manual tether breaking in large scale arrays is inefficient, photoresist tethers of the same or similar dimensions may be substituted and then removed by oxygen plasma ashing after the plates are freed and dried. Photoresist tethers, however, are not able to withstand the 49 percent hydrofluoric etching process and most of them may peel off within 2 minutes of exposure to the etch.

It has been observed in the fabrication process that intrinsic flap bending caused by intrinsic stresses are substantially independent of the metalization. Therefore, intrinsic bending can be modeled assuming a nitride polysilicon laminate for flap 14. Further, the amount of plate bending is generally much larger than beam bending and in the illustrated embodiment, was found to be of the order about 700 microns. When aluminum metalization is used, subsequent annealing to reduce aluminum to polysilicon contact resistance can significantly increase aluminum stress thereby increasing the bending by approximately 25 percent.

Thermal motion of flap 14 can be approximately modeled by considering actuator 10 as being a bi-layer thermostat composed of a gold layer and a composite nitride/polysilicon layer. Horizontal and vertical deflections of more than 100 microns are typically observed indicating a temperature of 300 degrees C. The frequency response of thermal actuation of the device is for a flap 300 microns$^2$ with cantilevered beams 200 microns long and 18 microns wide, has a bandwidth of about 1 kHz with a first mode resonant frequency at about 1 kHz. Smaller resonant peaks are observed at 180 Hz and 360 Hz. The motion of flap 14 will be the result of both thermal effects as well as magnetic effects. The two can be separated by first passing a DC current through coil 12 and observing the thermal motion of the flap until it comes to rest. Thereafter, current is applied to electromagnetic coil 12 and the motion followed.

The external electromagnetic field has been created both by permanent and electromagnets typically disposed underneath flap 14 which is then biased with DC currents ranging from 0 to 50 milliamps. Field strengths for the electromagnet generated field are variable with a peak value of 1.76 kGauss at 2.5 amps current input with a permanent magnet providing a constant magnetic flux density of approximately 2.8 kGauss as measured at the permanent magnet's surface. The gradient of the magnetic field, B, near flap 14 is about 280 Gauss per centimeter. Under a 1.4 kGauss magnetic flux density, and a 40 ma coil current (70 milliwatts) flowing through three turns of coil 12, a flap having a size of 420 microns$^2$ and suspended on size by two beams 16 280 microns long and 20 microns wide make a +/−100 micron vertical deflection.

A typical flap 14 described above will survive a 50 meter per second air flow or greater when the coil side of flap 14 faces the wind. Flap 14 will fold over by 180 degrees and break in about 20 meters per second air flow in the opposite direction. Improvement in intrinsic bending is expected to be realized by designing laminate layers that have zero combined stress.

Figure 4:
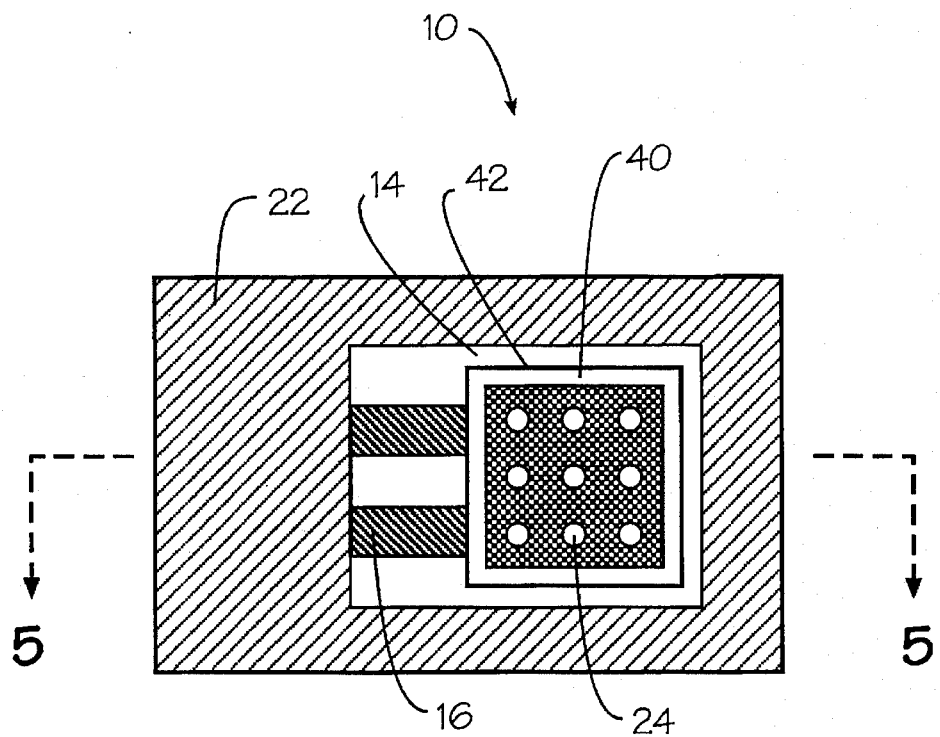
FIG. 4 is a top plan view of a second embodiment of an out-of-plane magnetic actuator devised according to the invention.

The micro actuator described utilized an electromagnetic coil 12, however, coil 12 may be replaced by electroplated permanent magnets in order to avoid thermal induced bending. FIG. 4 shows in top plan view with FIG. 5 being a cross sectional longitudinal view seen through section lines 5—5 of FIG. 4. As before, magnetic actuator 10 of FIG. 4 is comprised of a suspended polysilicon plate 40 with an electroplated Permalloy layer 42 disposed thereover. An external magnetic field produced by conventional means is provided perpendicular to the surface of substrate 22 and deflects the flap 14 out of the plane of substrate 22.

Figure 6A:
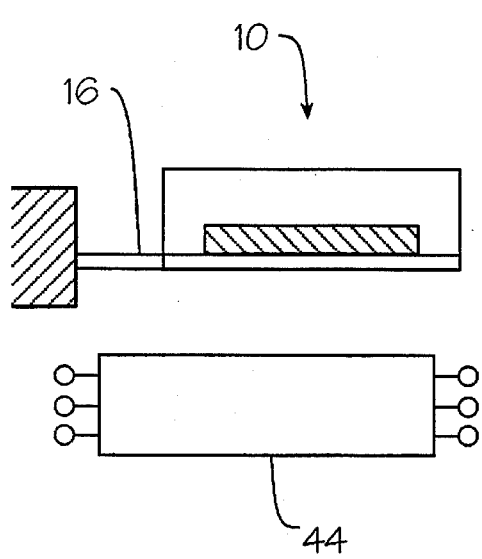
FIG. 6a and b is a simplified side elevational diagram illustrating the operation of the actuator of the invention.
Figure 6B:
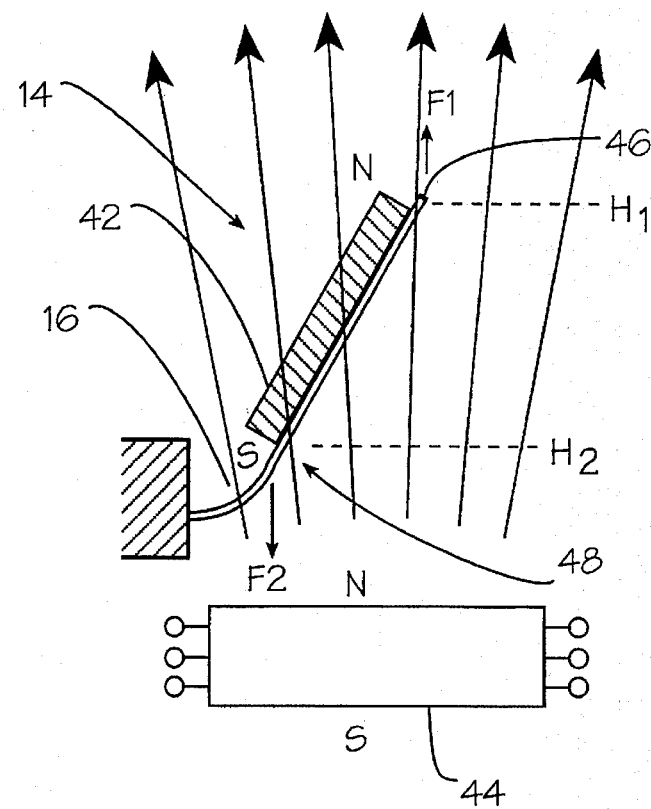

The physics of the magnetic actuation are illustrated in connection with FIGS. 6a–b. FIG. 6a shows actuator 10 in a rest position in ambient magnetic fields with electromagnet 44 off. FIG. 6b is a simplified side elevational view of the actuator of FIG. 6a with electromagnet 44 energized to produce magnetic forces F1 and F2 on upper edge 46 and lower edge 48 of flap 14. Assuming that two magnetic poles of opposite polarities are fixed at the two ends of Permalloy plate 42, forces will be developed in the direction shown by the arrows for F1 and F2 in FIG. 6b which will deflect flap 14 out of the plane of substrate 22. Flap 14 can be regarded as essentially rigid so that the entire bending is taken up by beams 16. The result is a counterclockwise torque arising from F1 and a downward force arising from F2–F1. The counterclockwise torque is dominate with the result that beams 16 are deflected out of plane. The downward deflection on beam 16 caused by the net downward force will be approximately 8 to 10 times smaller than that caused by the out-of-plane torque.

The maximum strain of beam 16 can be computed and a maximum angle of bend determined at which fracture will take place. It can be computationally predicted that flap 14 can bend by as much as 118 degrees before fracture occurs in the case of silicon beams. This implies that flaps 14 will never reach their fracture point in a uniform magnetic field with field lines perpendicular to the surface of substrate 22. However, it should be noted that once flaps 14 are in a flow field, flow induced bending and vibration can theoretically be larger than a fracture angle.

Figure 5:
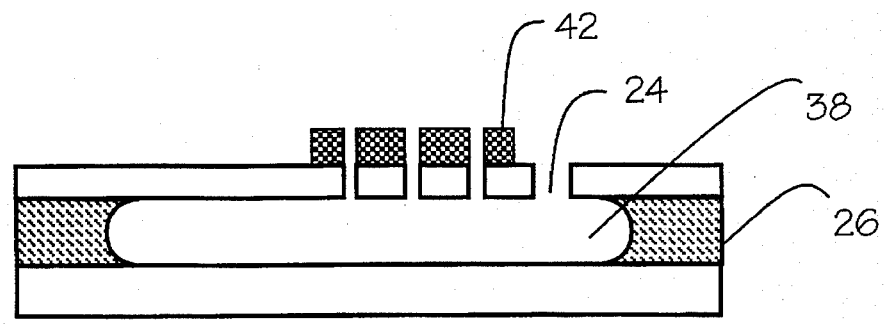
FIG. 5 is a cross-sectional view of the embodiment of FIG. 4 taken through section lines 5—5.
Figure 7A:
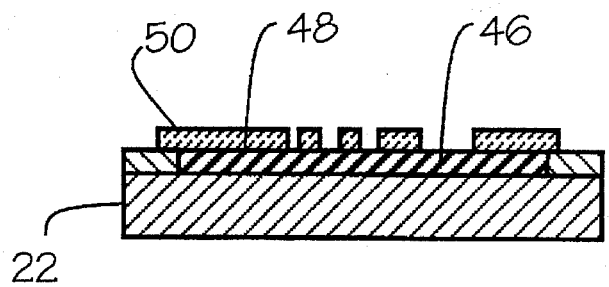
FIGS. 7a–d are simplified cross-sectional views in enlarged scale showing the method of fabrication of the actuator of FIGS. 4 and 5.

FIG. 7a–7d illustrates the major fabrication steps in the actuator of FIGS. 4 and 5. Conventional surface micromachining procedures are followed to fabricate the polysilicon plates/beam structures on top of a 3 micron thick phosphosilicate glass sacrificial layer 46 disposed on substrate 22 as shown in FIG. 7a. Polysilicon layers 48 are selectively disposed through conventional photolithographic techniques. Polysilicon layer 48 is then covered with a thin 0.5 micron thick phosphosilicate glass layer 50 as shown in FIG. 7a which serves as a complementary phosphorous doping source. During the one hour, 1,050 degrees Centigrade stress relief annealing, polysilicon layer 48 is doped from both sides to avoid intrinsic bending due to unbalanced doping concentrations. Top phosphosilicate glass layer 50 is later removed by a buffered hydrofluoric acid etch.

Figure 7B:
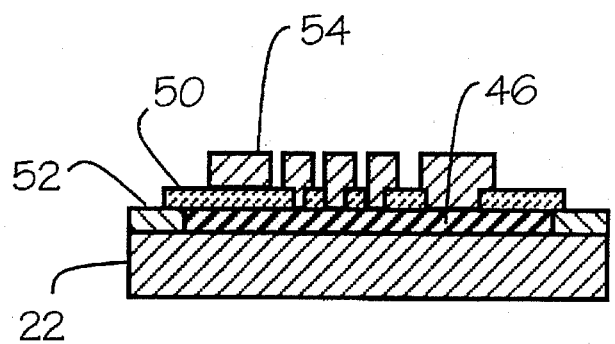

A 200 angstrom chromium 1800 angstrom cooper thin film is then vapor deposited over polysilicon layer 48 as a conductive seed layer 52 as shown in FIG. 7b. A 5 micron thick photoresist 54 is selectively applied and patterned to form molding frames inside which Permalloy ($Ni_{80}Fe_{20}$) are electroplated. A frame plating technique which is used is known in the thin film magnetic industry and which creates high quality Permalloy films.

During the plating process, the wafer is affixed to the cathode and is oriented in such a way that the external magnetic field is parallel to the supporting beam 16. Electroplating rate is approximately 5 microns per hour under a bias current density of 8 milliamps per square centimeter. The resulting Permalloy has a saturated magnetization of 1.35 Tesla, relative permeability of 4500, a small remnant magnetization between 1 and 10 Gauss and a coercive force of 4 Oe.

Figure 7C:
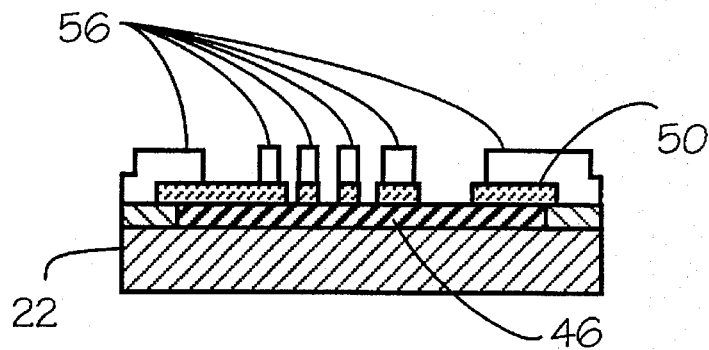
Figure 7D:
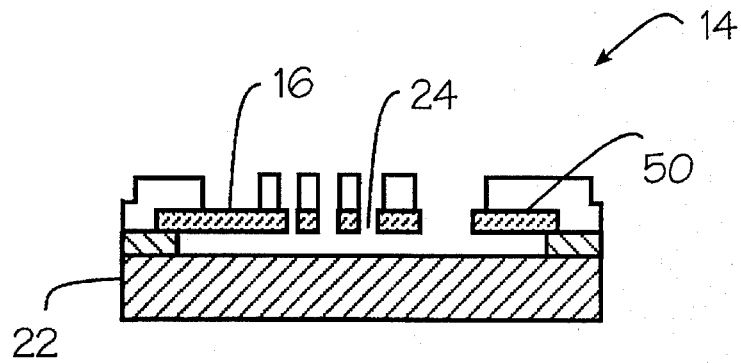

After electroplating, the wafer is flooded with ultraviolet light and frame photoresist 54 is removed leaving the patterned plated Permalloy 56 as shown in FIG. 7c. Seed layer 52 is etched away using a cooper etchant and standard chromium mask etchant. Flaps 14 are then released by etch in 50 percent hydrofluoric acid for 20 minutes as shown in FIG. 7d. To facilitate a sacrificial release process, etch holes 24 approximately 30 microns by 30 microns in size and 250 microns apart are open through flap 14.

Since microflaps 14 have large surface areas and supporting beams 16 are soft with a spring constant of about 100 microNewtons per millimeter, they can be easily pulled down by surface tension to the substrate and form permanent bonds if conventional drying techniques are used after the last etch. Under room temperature and pressure the drying technique of the invention can provide yields of 100 percent.

Prior attempts to solve the release problem have focused on eliminating the liquid-vapor phase transformation which induces deflection in flap 14. For example, liquid freezing/ sublimation techniques have been applied at different temperatures by Gucket et al., "The Application Fine-Grain, Tensile Polysilicon to Mechanically Resonant Transducers," Sensors and Actuators, Vol. 821, at 346–51 (1990), and Takeshimo et al., "Electrostatic Parallelogram Actuators," Transducers '91 at 63–6 (1991). Another solution based on a transformation from a supercritical liquid to air has been used as shown by G. T. Mulhern et al, "Supercritical Carbon Dioxide Drying Microstructures," proceedings, Transducer '93 at 296 (1993). Mulhern's method involves counteracting surface tension induced deflection during the drying process by using polymeric anchors, which can be subsequently removed by plasma etching. A third solution is based on a surface treatment which stops the formation of permanent bonds between flap 14 and its underlying substrate in layers after they have been brought together. See R. L. Alley et al., "The Effect of Release-Etch Processing on Surface Microstructure Stiction," IEEE Solid State Sensor and Actuator Workshop, Hiltonhead Island, S.C., at 202–07 (1992).

According to the drying process of the invention, microstructures of flap 14 are prevented from being pulled down to the substrate by levitating them out of the plane during drying. This levitation is provided by attaching a thin film permanent magnet at the end of the microstructures, which is inherent in a magnetic actuator in any case, then applying an external magnetic field to mildly deflect the structure upward.

In the cases where the Permalloy layer 50 is not desired as a part of the final product, it can be deposited over a polymeric layer and later removed by undercutting and stripping the underlying polymer by dry etching. In the case where a polymer layer is used, release can be obtained using a dry plasma etch instead of a wet etch. The dry plasma etch may be combined with the magnetic release described above if needed.

There are other magnetic compounds which can be used in place of Permalloy. These compounds can be deposited selectively in the structures and later dry etched with fluorine- or chlorine-based gasses. The exact etching parameters, the selection of gas, the pressure and power can be calibrated so that the organic compound is etched at a much faster rate than other exposed materials in the device.

Figure 8A:
FIGS. 8a–h are cross-sectional views of a wafer illustrating the fabrication of a multiple coil actuator.
Figure 8B:
Figure 8C:
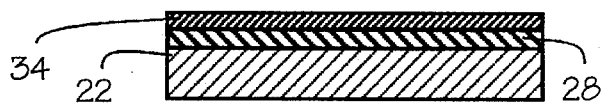
Figure 8D:
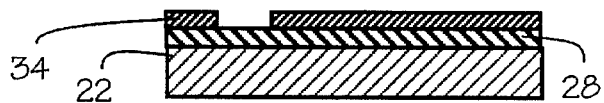
Figure 8E:
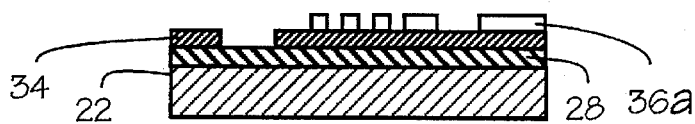
Figure 8F:
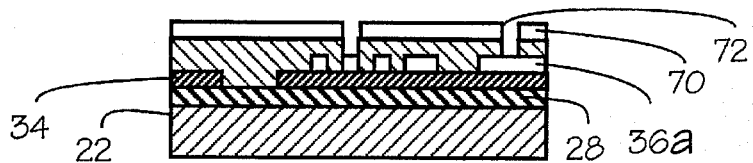
Figure 8G:
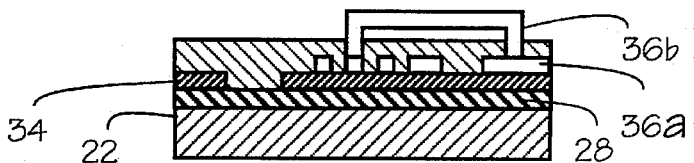
Figure 8H:
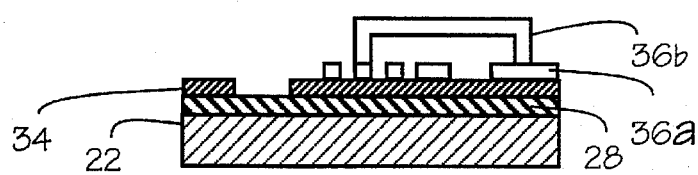

FIGS. 8a–i illustrate the method of fabricating another embodiment of the invention in which multiple coils are employed on flap 14 and on adjacent substrate 22. As before a front side polished silicon substrate 22 is provided as shown in FIG. 8a. A polysilicon glass layer 28 is deposited at FIG. 8b. A nitride layer 34 is deposited at the step of FIG. 9c and selectively patterned using conventional photolithography techniques at as shown at FIG. 8d. A first metalization 36a, which is preferably a laminate of 10 nm of Cr and 400 nm of Au, for defining at least a first coil is deposited on nitride layer 34 and selectively patterned as shown at FIG. 8e. A photoresist layer 70 is spun onto the surface and patterned to form contact holes 72 over metalization 36a. A second metalization 36b is then deposited of the same type as first metalization 36a, but at a slower rate to avoid burning photoresist 70. Second metalization 36b is patterned as shown in FIG. 8g and photoresist 70 removed, and sacrificial layer 28 selectively removed to create flap 14 as described above and shown in FIG. 8h to produce a double layer coil actuator 10 as shown in plan top view in FIG. 8i.

Figure 8I:
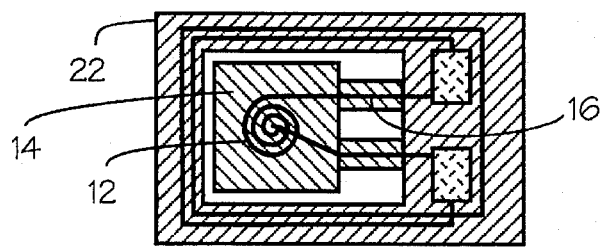
FIG. 8i is a top plan view of the device fabricated according to the method illustrated in FIGS. 8a–h.

It is entirely within the scope of the invention that more than two coils or metalizations 36 could be similarly devised on flap 14. Further, one or more coils 74 may be similarly fabricated and placed on the adjacent regions of the wafer as shown in FIG. 8i, although not described in connection with the fabrication of the flap coils in FIGS. 8a–h. Coils 74 would then be used to generate the magnetic field in which flap 14 would be operable. Second metalization 36b may be formed as an air bridge over metalization 36a. Air bridges for the metalizations may be used both for the coils on flap 14 and coils 74. For example, some of the air bridges formed by contact the coil of the first metalization only at its center and one outside coil as suggested in the cross-sectional view of FIG. 8h, or may use anchors at midway points to prevent sagging of the bridge, which would short out one or more turns of the coil. The air bridges are substantially more flexible than beams 16 and hence would not materially affect the deflection of flap 14.

The invention now having been described in terms of the structure of the actuator and the method of its manufacture, consider some of the applications to which it may be put. In the delta wing application of the illustrated embodiment, an array of microflaps as described above, are mounted on the wing surface to deflect 1 to 2 millimeters out of the plane of the wing or at least through a substantial thickness of the boundary layer over the wing. The system may include an array of shear stress sensors disposed on the wing for sensing the turbulence of the vortices propagating across the wing. An on-chip neural network processes the sensor signals according to a built-in feedback algorithm. The output of the signals drive the micromagnetic flap array to reduce the vortices.

Figure 9:
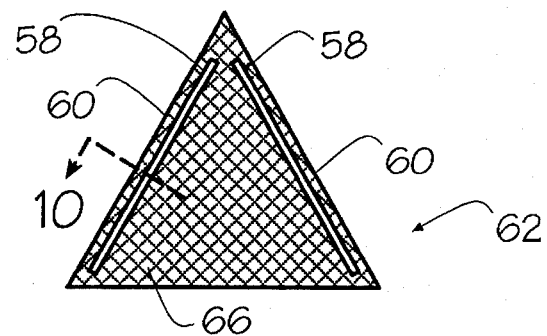
FIG. 9 is a simplified bottom plan view of a delta wing illustrating application of the actuators of the invention therein.
Figure 10:
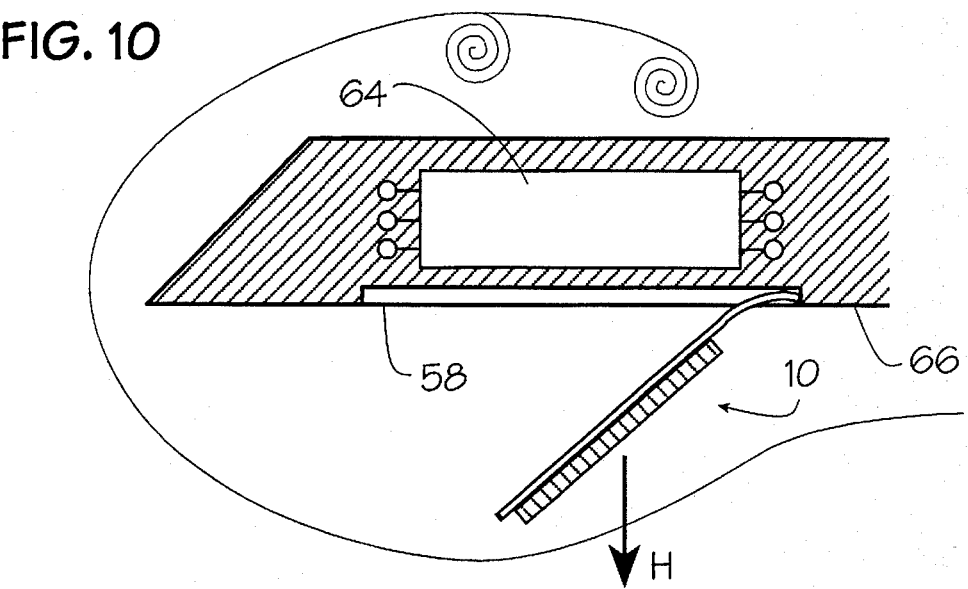
FIG. 10 is a simplified cross-sectional view in enlarged scale of a portion of the delta wing of FIG. 9.

In the illustrated embodiment, the delta wing is assumed to have a top angle of 67 degrees as shown in FIG. 9. Two grooves 58 parallel to leading edges 60 of wing 62 are opened on the bottom side with a delta wing as better shown in FIG. 10. Each groove may for example be 250 millimeters by 4 millimeters in size and 5 millimeters away from the leading edge of the wing. A plurality of electromagnets 64 are disposed in groove 58 in linear arrays of magnetic flap actuators of the type described above in connection with FIGS. 4–6. Actuators 10 are mounted on top of electromagnets 44 flush with the delta wing surface 66. A current is supplied through the electromagnets to generate a perpendicular magnetic field through the linear array of actuators 10 with a field strength of approximately $2.1 \times 10^4$ amperes per meter on the actuator plane. Actuation of the electromagnets create a rolling moment on the wing. A highly repeatable rolling moment to vortex lift moment is created as various air flow speeds across wing 62. The maximum ratio of roll moment to vortex lift moment was about 1.2 percent at a flow speed of 16 meters per second.

As a microactuator flaps 10 in groove 58 are positioned closer to leading edge 60, the local flow speed is higher and the boundary layer thinner resulting in a more significant rolling moment. Roll moments to vortex lift moment ratio as high as 10 percent can be achieved at 16 meter per second air flow speeds when the passive flap is right on leading edge 60. In a delta wing F15 fighter, this would be sufficient to turn the fighter 360 degrees in about 1 second. It is expected that the fluid loading of flaps 14 will be increased by increasing both the flexibility of flaps 14 and their robustness and further increasing the Permalloy/magnetic field interaction.

Therefore, it can now be appreciated that by using arrays of micromachines the size of pinpoints which may be computer controlled, the fluid dynamic control of airplanes, ships and vehicles may be more intelligent controlled to reduce turbulent drag in such vehicles and other devices. The application is not limited to the control of fluid dynamic surface flows on planes, ships, and vehicles, but can be used anywhere where fluid flows over a surface, including biomedical applications such as in vascular system, pipes, hoses, conduits and the like.

The advantages to be realized by the reduction of turbulent drag are believed to be significant. For example, reduction of turbulent drag in an airplane by only 1 percent, may reduce operating costs by 20 percent or more. Furthermore, control of a large aircraft using out-of-plane microactuated flaps is expected to eliminate or reduce the need for rudders, aerolons, elevators, flaps, spoilers, and similar aerodynamic devices used by conventional aircraft for control, which devices contribute substantially to the radar cross section of the aircraft.

Further, the microactuators of the invention could be installed within the blades of jet turbines to improve flow of air and fuel to allow higher engine operating temperatures that increase efficiency. Other applications of the these devices could be used to suppress jet engine exhaust noise.

More particularly, arrays of actuators 10 can be disposed on a surface at a position just upstream in a fluid flow over the surface from where flow separation would normally occur. By oscillating actuators 10 at a selected frequency in response to the flow dynamics, flow separation can be avoided in circumstances where it may otherwise occur leading to many consequent advantages including dramatically increased heat exchange between the fluid and surface.

Figure 11A:
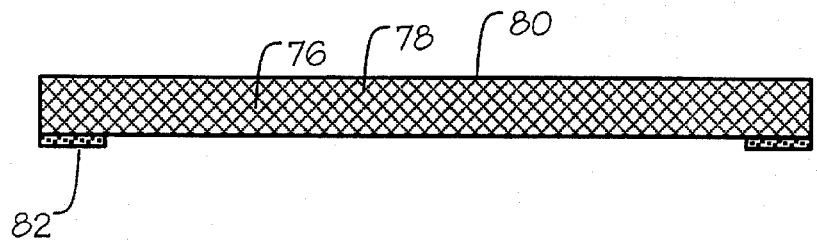
FIG. 11a–e are cross-sectional view of a wafer illustrating a bulk machining method of fabricating an actuatable shutter.
Figure 11B:
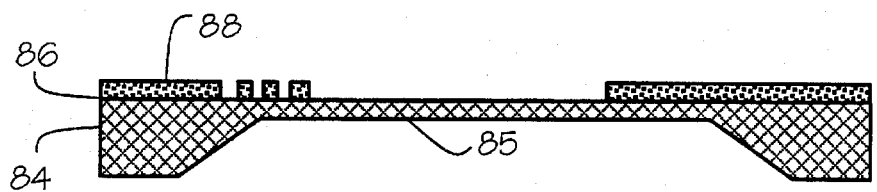

The applications of the invention are not limited to aerodynamics or fluid dynamics, but can be used generally in optical and microwave fields. FIGS. 11a–e illustrate a bulk micromachining application wherein a shutter, mirror or antenna is fabricated. A <100> silicon substrate 22 with a 35 micron epitaxial layer 78 of silicon and a 4 micron boron etch stop layer 80 is coated on its front and back sides with photoresist 82 and patterned for the definition of double alignment marks as shown in FIG. 11a. The wafer is then bulk machined by plasma etching to create membrane 85 and the alignment marks transferred to the silicon as shown in FIG. 11b.

Figure 11C:
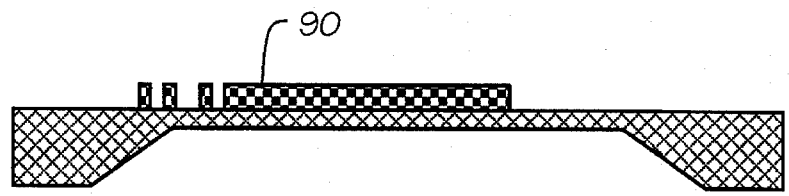

Photoresist 82 is removed and the wafer is oxidized with a 5000 Angstrom thick silicon dioxide layer 84, a 200 Angstrom Ti and a 1000 Angstrom Cu seedlayer 86 is disposed on oxide layer 84 by vapor deposition. A layer 88 of photoresist is spun on and patterned to form a mold for the Permalloy layer 90 to be later deposited as shown in FIG. 11b. The wafer is then electroplated with 5–7 microns of Permalloy and photoresist 88 removed to create the patterned Permalloy layer 90 as shown in FIG. 11c on the top surface of the wafer.

Figure 11D:
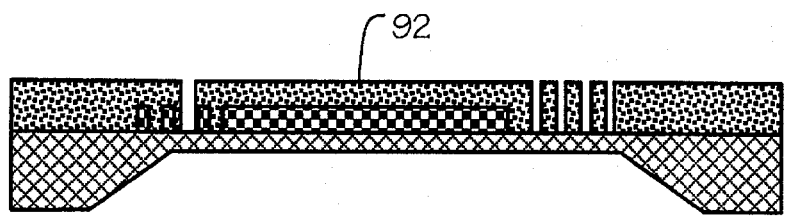
Figure 11E:
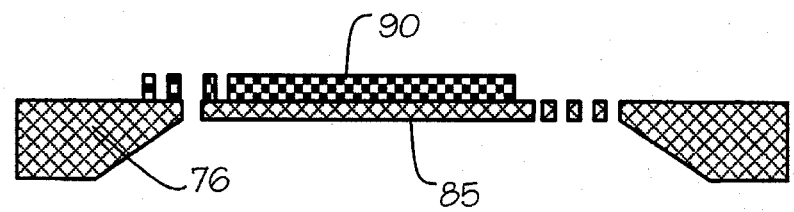

The exposed portions of seedlayer 86 is then etched away and a new 20 micron photoresist layer 92 is spun on and patterned to form an reactive ion etchant mask as shown in FIG. 11d. The wafer is then reactive ion etched until the structure is free as shown in FIG. 11e and layer 92 removed.

Figure 12:
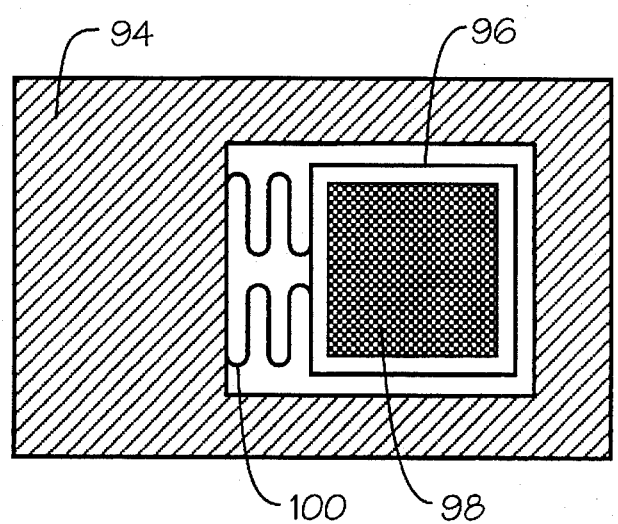
FIG. 12 is top plan view of the shutter fabricated according to the method of FIGS. 11a–e.

FIG. 12 is a plan top view of the fabricated device which results from the method of FIGS. 11a–e. Wafer 94 is separated from shutter 96 which carries Permalloy plate 98 and is connected to wafer 94 by means of two cantilevered serpentine beams 100. In the bulk machined actuator plate 98 is 2.9 mm by 1.6 mm and 5–7 microns thick. Shutter 96 is 3 mm by 1.8 mm and is 39 microns thick. Beams 100 are 120 microns wide and 39 microns thick.

In one embodiment mechanical stops for shutter 96 were fabricated below membrane 85 from Permalloy beams 8 microns wide and 200 microns long formed in the shape of an X to prevent shutter 96 from descending below the plane of the wafer. An external 500 Gauss magnetic field is sufficient to deflect shutter 96 of the order of 1 mm at low frequencies out of the plane of wafer 94 at an angle of 30 degrees. Increasing the field to 1000 Gauss causes deflections of up to 60 degrees. Shutters without stops vibrate above and below the plane of the wafer depending on the initial orientation of the wafer relative to the field. A downward inclination of the wafer resulted in downward deflection of the shutter and vice versa. Shutters with stops always move out of the plane of the wafer.

A surface micromachine shutter can also be fabricated using techniques similar to the surface micromachine actuators as described in connection with FIGS. 1 and 4. A rear wafer opening can be formed by wet etching the back side of the wafer beneath flap 14. Performance of surface micromachined shutters were comparable to bulk machined shutters as described above.

While a shutter has been described in the context of FIGS. 11a–e and 12, shutter 94 can be processed to act as a mirror by providing an appropriate reflective surface on the smooth or polished silicon surface. Applications for controllable reflectors is expected to have utility in laser disk equipment and optical communications. Alternatively, further processing steps could add coils or antennas which would be used as orientable arrays of high frequency antennas to create variable focused high frequency beams or receivers. In the instances where the antenna elements are made from doped silicon their radar cross-section could then be varied both by altering their conductivity using antifuse technologies and altering their orientation.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result.

In addition to the equivalents of the claimed elements, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A microelectromechanical magnetic actuator comprising:

a substrate having a surface;

a micromachined flap defined from said surface of said substrate and separated therefrom;

at least one micromachined cantilevered beam defined from said surface of substrate coupling said flap to said substrate;

a magnetic layer disposed on said flap; and a selectively actuatable magnetic field source disposed proximate to said actuator to create a magnetic field in the vicinity of said flap to bend said flap on said cantilevered beam in a predetermined direction to the plane of said surface of said substrate, whereby a magnetically actuated flap is provided which is selectively disposable out of said surface of said substrate.

2. The actuator of claim 1 wherein said magnetic source is an electromagnet.

3. The actuator of claim 1 wherein said magnetic layer is comprised of a magnetic coil disposed on said flap.

4. The actuator of claim 3 further comprising a current source and wherein said magnetic coil is coupled to said source of current by conductive lines extending from said magnetic coil to said current source, said lines being disposed along said at least one cantilevered beam.

5. The actuator of claim 3 wherein said magnetic source is a permanent magnet.

6. The actuator of claim 3 wherein said magnetic field source comprises at least one magnetic coils disposed on said substrate.

7. The actuator of claim 3 further comprising a plurality of said magnetic coils disposed on said flap.

8. The actuator of claim 7 wherein said magnetic field source comprises at least one magnetic coils disposed on said substrate.

9. The actuator of claim 1 wherein said flap has a plurality of holes defined therein to facilitate separation of said flap from said underlying substrate.

10. The actuator of claim 1 wherein said predetermined direction has at least a component which is out of the plane of said substrate.

11. The actuator of claim 1 wherein said predetermined direction has at least a component which is in the plane of said substrate.

12. The actuator of claim 1 wherein said flap is optically opaque so that said actuator functions as an optical shutter.

13. The actuator of claim 1 wherein at least two cantilevered beams are provided to couple said flap to said substrate.

14. The actuator of claim 1 wherein said flap is optically reflective so that said actuator functions as an optical mirror.

15. The actuator of claim 14 further comprising a reflective layer disposed on said magnetic layer of said flap.

16. The actuator of claim 1 wherein said magnetic layer is comprised of a permanent magnet.

17. The actuator of claim 16 wherein said permanent magnet is a layer of Permalloy.

18. The actuator of claim 16 wherein said permanent magnet has an alterable polarity.

19. The actuator of claim 1 wherein said cantilevered beams are linear.

20. The actuator of claim 1 wherein said cantilevered beams are serpentine.

21. An improvement in a method of fabricating a microelectromagnetic magnetic actuator, said improvement comprising:

providing a substantially completed microelectromechanical magnetic actuator on a sacrificial layer disposed on an underlying substrate;

removing said sacrificial layer upon which said microelectromechanical magnetic actuator has been fabricated by etching away said sacrificial layer through at least one opening defined through said microelectromechanical magnetic actuator to expose said underlying sacrificial layer; and drying said microelectromechanical magnetic actuator while simultaneously actuating said microelectromechanical magnetic actuator to maintain the released portions of said actuator out of contact with said underlying substrate until said drying is complete.

22. The improvement of claim 21 where removal of said sacrificial layer is facilitated by providing a plurality of holes through said microelectromechanical magnetic actuator to increase etchant access to said underlying sacrificial layer.

23. In a method of fabricating a surface micromachine cantilevered layer disposed over an underlying substrate, an improvement comprising:

providing said cantilevered layer on a sacrificial layer which in turn is disposed upon said substrate;

disposing a magnetic layer on said cantilevered layer;

removing said sacrificial layer beneath at least part of said cantilevered layer to release said cantilevered layer from said substrate; and simultaneously maintaining said cantilevered layer apart from said substrate layer by exposing said magnetic layer to a magnetic field which tends to lift said cantilevered layer away from said substrate, said cantilevered being maintained separate from said substrate until removal of said sacrificial layer is completed and possibility of adhesion of said cantilevered layer to said substrate substantially extinguished.

24. The method of claim 23 where disposing said magnetic layer comprises disposing a Permalloy layer.

25. The improvement of claim 24 further comprising disposing an organic polymer on at least said cantilevered layer prior to disposition of said magnetic layer thereon and selectively removing said organic polymer layer and said magnetic layer disposed thereon after removal of said sacrificial layer is complete.

26. The method of claim 23 where removing said sacrificial layer from underneath at least part of said cantilevered layer comprises wet etching said sacrificial layer away and where simultaneously maintaining said cantilevered layer out of contact with said substrate is performed until said microelectromagnetic device is dried.

27. The improvement of claim 26 further comprising disposing an organic polymer on at least said cantilevered layer prior to disposition of said magnetic layer thereon and selectively removing said organic polymer layer and said magnetic layer disposed thereon after removal of said sacrificial layer is complete.

28. The improvement of claim 27 where removing said organic polymer is performed with a dry plasma etch so that stiction is avoided.

29. In a method of controlling flow of a fluid across a surface of an object an improvement comprising:

disposing a plurality of microelectromechanical actuators on said surface, each having a selectively operable flap extendable in a direction out of said surface into a boundary layer above said surface over which said flow is established; and selectively actuating at least some of said plurality of microelectromechanical actuators to dispose their corresponding flaps into said boundary layer to thereby affect said flow of said fluid.

30. The method of claim 29 where selectively disposing said corresponding flaps into said boundary layer at a position upstream from expected flow separation and oscillating said flaps to affect flow separation of said fluid at a point downstream from said flaps.

31. The improvement of claim 29 where selectively disposing said corresponding flaps into said boundary layer comprises electromagnetically actuating said flaps to bend said flaps into said boundary layer out to the plane of said actuator to affect turbulent flow.

32. The improvement of claim 29 wherein said surface is an airplane control surface and where selectively disposing said corresponding flaps serve to provide a control force to said airplane control surface.

33. The method of claim 29 where selectively disposing said corresponding flaps into said boundary layer serves to reduce fluid drag of said surface.

* * * * *